Feb. 15, 1944.    M. WINER    2,341,585
GUN HAND GUARD
Filed July 1, 1940

INVENTOR
Max Winer
BY
ATTORNEY

Patented Feb. 15, 1944

2,341,585

UNITED STATES PATENT OFFICE 2,341,585

GUN HAND GUARD

Max Winer, Medford, Mass.

Application July 1, 1940, Serial No. 343,418

4 Claims. (Cl. 42—71)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to gun hand guards.

In the manufacture of firearms it has been customary to provide a wooden hand guard to protect the hand of the gunner from the heat of the barrel and to afford convenience in handling. During rapid or sustained firing, especially with automatic or semi-automatic guns, the barrel becomes sufficiently hot to produce charring and weakening of the wooden hand guard. Proposals to remedy this deficiency by substituting a plastic for the wood have not been adopted because the plastic is heavier than wood and possesses an appreciable heat conductivity resulting in an uncomfortable feeling to the hand during rapid fire.

The purpose of this invention is to provide a gun hand guard in which heat insulation is obtained by employing wood or a suitable heat barrier in combination with a plastic material.

The specific nature of the invention as well as other objects and advantages thereof will clearly appear from a description of a preferred embodiment as shown in the accompanying drawing in which.

Figure 1:
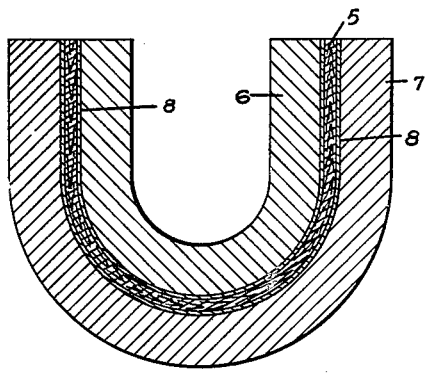
Fig. 1 is a transverse sectional view of a hand guard showing one method of carrying out the invention.

Referring to Fig. 1 the hand guard comprises an appropriately formed sheet layer or wall 5 of wood, an inner wall 6 of a substantially non-charring, non-heat-softening plastic material such as a synthetic resin, and, when desired, an outer wall 7 similar to the inner wall 6, the walls being bonded by a layer 8 of heat-hardening resin such as a phenol-formaldehyde cement.

The sheet 5 of wood in the natural or machine finished condition may be preliminarily processed by vacuumizing or pressure treatment or combinations thereof to open the pores. The wood is then treated or impregnated with heat-hardening resin cement in the liquid or plastic state. The cement may have incorporated therein other natural or synthetic resins, gums, plasticizers, diluents, solvents, curing agents, fillers, catalysts or coloring materials.

The sheets or layers 6 and 7 of plastic, prior to application to the wood, may be in a state of final cure but preferably are in a condition such that further heat and pressure will render them infusible. Final cure of the sheets or the laminated structure may be effected by the application of heat and pressure in a press or mold or the structure may be allowed to remain in a container at a suitable temperature and pressure for a predetermined length of time.

Figure 2:
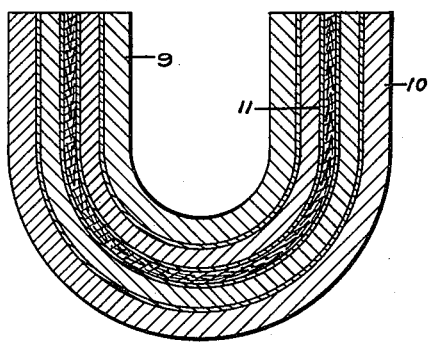
Figs. 2 and 3 are similar views of modifications of the laminated structure.

In the modification shown in Fig. 2 the inner wall 9 and outer wall 10 of plastic on opposite sides of the sheet 11 of wood are either or both of laminated formation.

Figure 3:
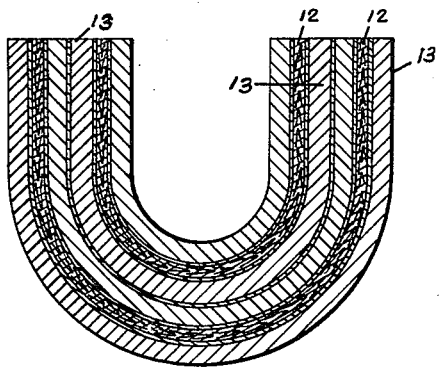

In Fig. 3 the laminated structure contains a plurality of sheets or layers 12 of wood and a plurality of sheets or layers 13 of plastic which may be of laminated formation as illustrated in the intermediate sheet.

Among the synthetic resins, the cold-molded resins containing as much as 80% asbestos are particularly appropriate, as they may be used continuously at temperatures as high as 1300° F.

It is to be noted that layers 5, 11 and 12 of wood completely separate the layers of synthetic resinous material contiguous to them; that there is no continuity of resinous material of either of the layers of the resinous material entirely through the layers 5, 11 and 12; and that physical contact of the resinous material of one of the layers of synthetic resinous material with the resinous material of another layer is prevented by means of the layers 5, 11 and 12. Thus, the layers 5, 11 and 12 of wood, which is less conductive of heat than the layers of resinous material, effectively retard the passage of heat from one resinous layer to the other. This favorable condition does not exist to the same desirable extent when fabric or woven material is laminated into synthetic resinous material, owing to the fact that resinous material of adjacent layers penetrates through the interstices of the fabric or woven material, so that there is physical contact or continuity of the layers of resinous material through the fabric or woven material. Heat, therefore, is able to be conducted from one layer of resinous material to the other through resinous material, in spite of the presence of fabric or woven material. The fabric or woven material is, therefore, merely reenforcing or strengthening means. The cellular structure of the wood used according to the present invention also aids in retarding passage of heat, since in effect each cell wall presents a barrier of lower conductivity than the synthetic resinous material.

I claim:

1. A gun hand guard, shaped to surround at least partially a gun barrel, comprising a layer of substantially non-charring, non-heat-softening synthetic resinous material, and a layer of a solid material less conductive of heat than said resinous material, said layer of resinous material being located in the hand guard to be adjacent the gun barrel when the hand guard is in use, said layers being bonded together without substantially any continuity of the material of the said layer of synthetic material entirely through the said layer of solid less conductive material.

2. A gun hand guard, shaped to surround at least partially a gun barrel, comprising a layer of substantially non-charring, non-heat-softening synthetic resinous material and a layer of wood, said layer of resinous material being located in the hand guard to be adjacent the gun barrel when the hand guard is in use, said layers being bonded together without substantially any continuity of the material of the said layer of synthetic resinous material entirely through the said layer of wood.

3. A gun hand guard, shaped to surround at least partially a gun barrel, comprising a layer of substantially non-charring, non-heat-softening synthetic resinous material, a layer of solid material less conductive of heat than said synthetic resinous material, and a second layer of a substantially non-charring, non-heat-softening synthetic resinous material, said first mentioned layer of synthetic resinous material being located in the hand guard to be adjacent the gun barrel when the hand guard is in use, said layer of solid less heat conductive material being positioned between the said first and second mentioned layers of synthetic resinous material, all of said layers being bonded together without physical contact or continuity of the materials of said two layers of synthetic resinous material through said layer of solid less heat conductive material, whereby conduction of heat between the two layers of synthetic resinous material must substantially all take place through the layer of solid less heat conductive material.

4. A gun hand guard, shaped to surround at least partially a gun barrel, comprising a layer of substantially non-charring, non-heat-softening synthetic resinous material, a layer of wood, and a second layer of substantially non-charring, non-heat-softening synthetic resinous material, said first mentioned layer of synthetic resinous material being located in the hand guard to be adjacent the gun barrel when the hand guard is in use, said layer of wood being positioned between the said first and second mentioned layers of synthetic resinous material, all of said layers being bonded together without physical contact or continuity of the materials of said two layers of synthetic resinous material through said layer of wood, whereby conduction of heat between the two layers of synthetic material must substantially all take place through the layer of wood.

MAX WINER.